United States Patent [19]

Gale et al.

[11] Patent Number: 4,487,462

[45] Date of Patent: Dec. 11, 1984

[54] THREADED COUPLING BONDING JUMPER

[75] Inventors: Edwin J. Gale, Aurora; Gordon Valentine, Denver, both of Colo.

[73] Assignee: Stanley Aviation Corp., Denver, Colo.

[21] Appl. No.: 460,149

[22] Filed: Jan. 24, 1983

[51] Int. Cl.³ .............................................. H01R 4/64
[52] U.S. Cl. .................................... 339/14 R; 361/215
[58] Field of Search .................. 339/14 R, 15, 143 R; 285/233, 353, 369; 174/78; 361/215

[56] References Cited

U.S. PATENT DOCUMENTS

| | | | |
|---|---|---|---|
| 3,227,803 | 1/1966 | Gohs | 174/78 |
| 3,336,566 | 8/1967 | Barker | 339/143 R |
| 3,448,430 | 6/1969 | Kelly | 174/78 X |
| 3,710,911 | 1/1973 | Eidelberg et al. | 174/78 X |
| 3,753,205 | 8/1973 | Tuger | 174/78 X |
| 4,029,386 | 6/1977 | Krantz et al. | 339/143 R |

*Primary Examiner*—Eugene F. Desmond
*Attorney, Agent, or Firm*—Fields, Lewis, Pittenger & Rost

[57] ABSTRACT

A threaded coupling assembly is provided for joining a pair of confronting conduit members and minimizing electrostatic charge buildup between the conduit members. Each conduit member has an annular flange fixed to the confronting ends thereof. A threaded coupling interconnects the two flanges and includes, in one embodiment, a coupler having an internal annular groove for releasably holding a first annular bonding jumper and an externally threaded outer end. A nut is threaded onto the coupler and has an internal annular bonding jumper retaining groove for a second annular bonding jumper. These bonding jumpers include an annular ring having a plurality of bonding jumper contact flanges at the inner edge which engage the surface of the flanges and made electrical contact therewith and have at least a plurality of spaced retaining tangs at the outer edge which snap into the retaining grooves in the coupler and the nut. In addition, the bonding jumper retained by the nut also includes a plurality of circumferentially spaced coupler contact tangs which are interspersed with the retaining tangs and contact the outer end of the coupler beyond the threads. In a second embodiment, a spacer coupling is provided between the conduit flanges which is threaded at both ends and receives a nut on each end containing a bonding jumper as described above.

18 Claims, 8 Drawing Figures

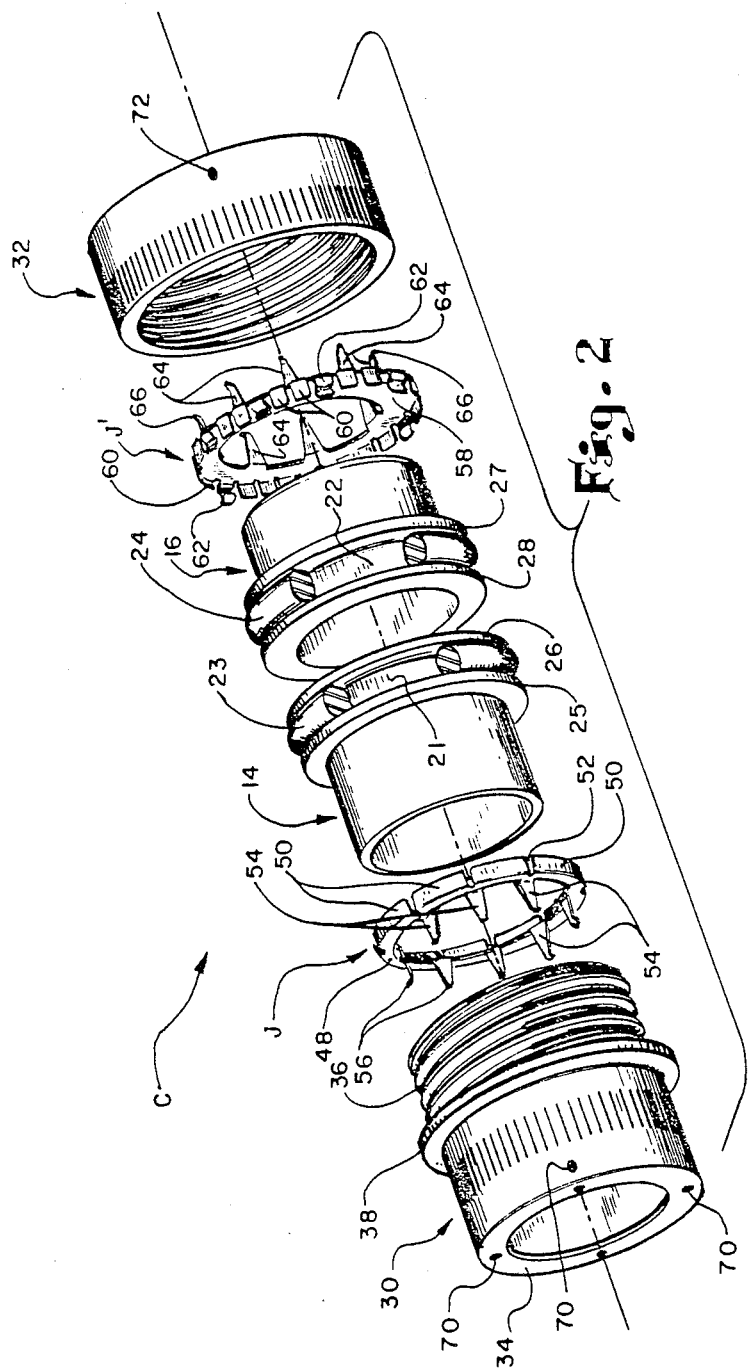

U.S. Patent   Dec. 11, 1984   Sheet 2 of 3   4,487,462
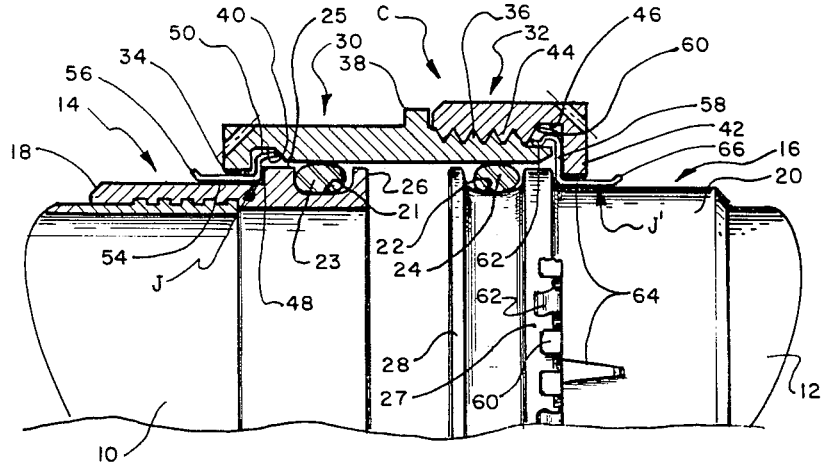
Fig. 3
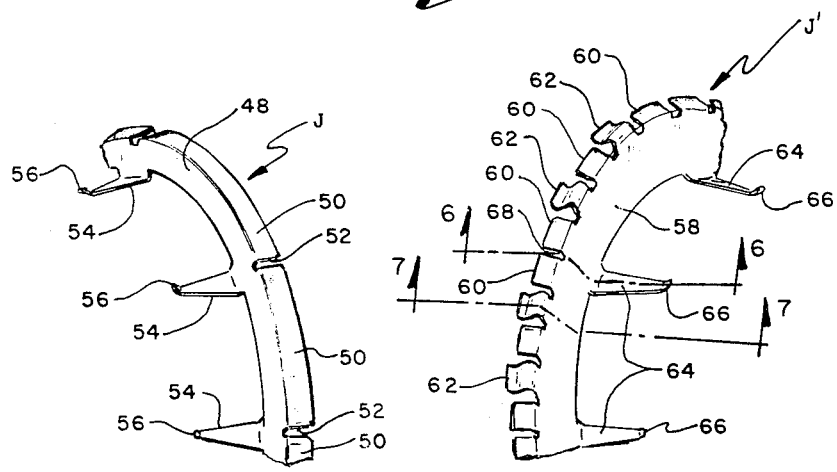
Fig. 5    Fig. 4
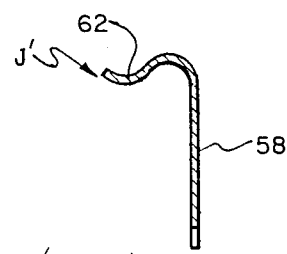    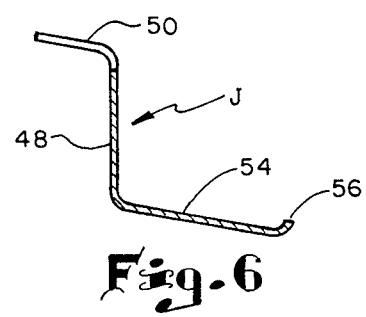
Fig. 7    Fig. 6

THREADED COUPLING BONDING JUMPER

FIELD OF INVENTION

The present invention relates to threaded coupling assemblies and, in particular, to a threaded coupling assembly for interconnecting a pair of confronting tubular conduit members in which the coupling assembly includes a bonding jumper for minimizing electrical charge build up on the conduit members.

BACKGROUND ART

When conveying fluid, such as jet fuel, between interconnected pipes, it is highly advisable to provide electrical continuity between the interconnected pipes. Electrical continuity assures that there will be no build up of an electrostatic charge on a first pipe relative to a second interconnected adjacent pipe. As a result, a potential difference between pipes or between a pipe and another reference surface is not created. It is readily understood that potential difference could give rise to an electrical spark and, in the presence of a vaporized fuel, the spark could cause the fuel to ignite. A number of patents have proposed solutions to this problem of electrostatic charge build up. In U.S. Pat. No. 3,611,248 to Turner, an electrical conductor ring is provided as a bonding jumper which is formed as a flexible metal strip bent at right angles along its longitudinal axis and notched to provide one set of flanges lying along the surface of the conductive pipe and a second set of flanges at right angles thereto, these latter flanges being engaged by follower rings associated with draw bolts which hold the pipe sections together to form an electrical path from one pipe section to the other. U.S. Pat. No. 3,753,205 to Tuger discloses a bonding jumper for a threaded coupling using cables having T-shaped ends which are clampled between the ends of the pipe sections of a ferrule placed over the respective ends of the pipe sections. The electrical contact is made through a retainer ring within the threaded coupling. U.S. Pat. No. 3,891,290 to Marshall discloses a spring-type washer provided internally between the ends of pipe sections and making contact between the ends when they are drawn toward each other within the threaded coupling. In U.S. Pat. No. 3,891,291 to Nadasdy et al. a tubular coupling is described which incorporates an electrical or bonding jumper. The bonding jumper includes an elongated leaf spring having undulations and made to fit wholly inside a retainer section. The leaf spring may include lateral projections which are wedged into locking engagement with side flanges within the retainer section. The leaf spring provides electrical contact between ferrules and fluid carrying tubular members. Although each of the above-mentioned patents disclose bonding jumpers which are satisfactory for their intended purpose, they either are difficult and time consuming to use or they are completely concealed within the coupling when in use, making it impossible to tell whether the bonding jumper, in fact, has been placed in the coupling without disassembling the coupling to look.

SUMMARY OF THE INVENTION

This invention relates to a threaded coupling assembly for interconnecting first and second confronting fluid-carrying conduit members wherein first and second coupling means are threadably interconnected and circumferentially engage the conduit members to hold them in fluid communication. Each coupling means has an internal, circumferential retaining groove. A bonding jumper is provided which is at least partially within each of the coupling members. The bonding jumper includes a ring having an external peripheral edge extending into the circumferential retaining and an internal peripheral edge sized to just slide over the end of the conduit member. A plurality of retaining tangs are spaced around the external periphery of the ring for locking the bonding jumper in the coupling means. Finally, a plurality of bonding jumper tangs are spaced around the internal periphery of the ring and extend axially beyond the edge of the coupling means and are engagable with the end of the conduit member to provide electrical contact between the conduit members through the bonding jumpers and the threaded coupling means.

More particularly, two forms of bonding jumpers are provided. In one form, the retaining tangs are relatively wide and extend generally axially from the outside peripheral edge of the ring, but are also inclined slightly in the radial direction so that they snap in the retaining groove in the coupling or coupling sleeve. These retaining tangs are separated from each other by a notch therebetween. The bonding jumper tangs extend from the inner periphery generally axially, but in the opposite direction of the retaining tangs and also extend slightly radially inward so that they are essentially parallel to the retaining tangs. One of the bonding jumper tangs is located opposite each of the notches. The end of these bonding jumper tangs are turned upwardly to form contact points against the conduit flange.

The bonding jumper which is received in the retaining groove of the nut is similar to the bonding jumper described above except that the retaining tangs are relatively narrow in width and are interspersed with curved or s-shaped coupler contact tangs which engage the outer end of the coupling sleeve outwardly of the threads thereon. These coupler contact tangs may be twisted or screwed in a clockwise direction as viewed from the open end of the nut to resist unthreading of the nut on the coupler.

In one embodiment, the coupling sleeve is threaded at one end and a nut is received thereover. In a second embodiment the sleeve is double threaded, having threads at each end and a nut is received on each end. In this embodiment, a bonding jumper having the coupler contact tangs is used within each nut.

The advantages of this invention are readily apparent. Since the bonding jumper tangs extend outwardly beyond the ends of the spacing coupler and nuts, one can always tell whether the bonding jumper is in place after the coupling assembly has been assembled. Furthermore, the multiple point contact provided by the tangs provides great redundancy in the system so that it can be assured that electrical contact will exist from one confronting conduit to the other. Conveniently, the bonding jumpers are snapped in place within a retaining groove by means of retaining tangs in the spacing coupler and the nuts to hold them in place so they are slid along the flanges of the conduits as the assembly is interconnected. Furthermore, the tangs tend to resist the unthreading of the nut from the spacing coupler.

Additional advantages of this invention will become apparent from the description which follows, taken in conjunction with the accompanying drawings.

BRIEF DESCRIPTION OF THE DRAWINGS

FIG. 2 is an exploded perspective view of the threaded coupling bonding assembly of FIG. 1;

FIG. 3 is an enlarged, partial, horizontal section, taken along line 3—3 of FIG. 1 showing the interrelationship between the threaded coupling parts and the bonding jumpers;

FIG. 4 is a fragmentary, enlarged, perspective view of the bonding jumper within the nut of the threaded coupling assembly of FIGS. 1–3;

FIG. 5 is an enlarged fragmentary view of the bonding jumper within the sleeve coupler of the theaded coupling assembly of FIGS. 1–3;

FIG. 6 is an enlarged, offset, sectional view, taken along line 6—6 of FIG. 4, showing details of the retaining tang and bonding jumper tang;

FIG. 7 is an enlarged offset sectional view, taken along line 7—7 of FIG. 4, showing details of a coupler contact tang.

DESCRIPTION OF THE PREFERRED EMBODIMENTS

Figure 1:
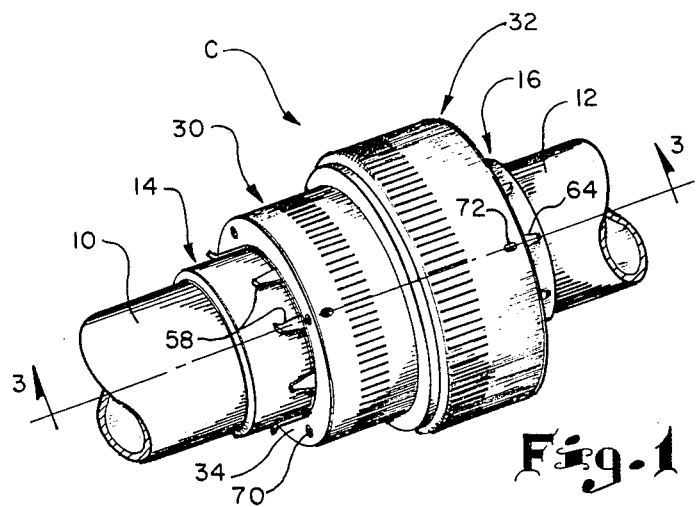
FIG. 1 is a perspective view showing one form of threaded coupling assembly and the associated bonding jumpers for interconnecting the confronting ends of two tubes or conduits.

In accordance with this invention, a threaded coupling C, whose parts are made of electrically conductive material, is provided for interconnecting the confronting ends of fluid-carrying tubes or conduits 10 and 12. A pair of assembly sealing flanges 14 and 16, respectively, are advantageously connected to the ends of tubes 10 and 12 as best illustrated in FIG. 3. The flanges each have a cylindrical skirt 18 and 20, respectively, which is attached to the respective tubes 10 and 12 by any suitable means such as swaging, brazing or welding. Conveniently, each flange is provided with a peripheral recess, such as recesses 21 and 22, respectively, for receiving O-rings 23 and 24, respectively. As can be seen, recess 21 is formed between a pair of peripheral ribs 25 and 26 and recess 22 is formed between a pair of similar ribs 27 and 28. The confronting ends of the conduits are interconnected by means of a threaded coupler 30 and a nut 32 which draw them toward each other to secure them together and form a fluid-tight seal, as will be described. Sleeve coupler 30 is generally cylindrical in shape and is slidable over conduit 10 and sealing flange 14 and has an inwardly projecting flange 34 on the outer end thereof and has threads 36 on the inner end. The inner and outer ends are separated by a peripheral external rib 38. Within coupler 30 and adjacent the inner side of flange 34 is a circumferentially retaining groove 40.

Nut 32 has an inwardly projecting peripheral flange 42 on its outer end and internal threads 44 which are received onto threads 36 of coupler 30. A circumferential retaining groove 46 is provided along the inner surface of flange 42 between this flange and threads 44. As can be seen from viewing FIG. 3, the conduits 10 and 12 can be drawn toward each other as nut 32 is threaded on coupler 30 until the inner peripheral edge of nut 32 engages rib 38 on sleeve coupler 30. The inner surface of coupler 30 bears against o-rings 26 and 28 to form a fluid seal.

Conveniently, a bonding jumper J, made of electrically conductive material, is removably held in groove 40 of coupler 30 whereas a bonding jumper J' is removably held in groove 46 of nut 32 and moves longitudinally with the coupler nut as they are drawn together. The bonding jumpers may best be understood by reference to FIGS. 2–7.

Bonding jumper J is generally cylindrical in shape and has a radially extending ring or body portion 48. The outer peripheral edge of this ring terminates in a plurality of relatively wide retaining tangs 50, in the form of circular segments, extending at an angle from one side of ring 48 and separated by notches 52. These tangs extend generally axially from ring 48 but radiate outwardly at a slight angle, such as 10°. The inner edge of ring 48 terminates in a plurality of spaced, generally triangular-shaped bonding jumper tangs 54 extending generally axially from ring 48 in the opposite direction from tangs 50 and radiate inwardly at a slight angle such as 10°. In other words, tangs 50 and tangs 54 are generally parallel to each other. Tangs 54 terminate in upwardly turned contact ends 56. Bonding jumper tangs 54 are located opposite notches 52. Conveniently, prior to assembly, bonding jumper J is placed within coupler 30 and retaining tangs 50 snap into place within retaining recess 40, as illustrated in FIG. 3. During assembly, bonding jumper tangs 54 slide longitudinally along the surface of skirt 18 of sealing flange 14 with coupler 30 so that ring 48 is drawn against the abutting surface of rib 25. Bonding jumper tangs 54 extend beyond the flange 34 thereof so that it can be seen if bonding jumper J is in place after assembly.

Similarly, bonding jumper J', also made of electrically conductive material, is generally cylindrical in shape and has a radially extending ring or body 58. However, ring 58 terminates at its outer peripheral edge in a plurality of relatively small retaining tangs 60 interspersed with coupler contact tangs 62. The inner peripheral edge of ring 58 terminates in spaced generally triangular-shaped bonding jumper tangs 64 having upturned ends 66. Thus, tangs 60 and 64 of bonding jumper J' have the same relative orientation with each other and ring 58 as tangs 50 and 54 of bonding jumper J have with each other and with ring 48. Also, bonding jumper tangs 64 extend beyond flange 42 of nut 32 so that it can be seen if bonding jumper J' is in place after assembly. Conveniently, a pair of retaining tangs 60 are positioned above each bonding jumper tang 66 and are separated by a recess or notch 68. In the space along the outer peripheral edge of ring 58 between the pairs of retaining tangs 60, single retaining tangs 60 are alternated with coupler contact tangs 62 which have a generally reverse curve or s-shape. Retaining tangs 60 snap into internal retaining groove 46 on nut 32 as illustrated in FIG. 3. Thus, the bonding jumper J' is releasably held in the retaining groove 46 as nut 32 is tightened on coupler 30. Advantageously, the bonding jumper tangs 54 of bonding jumper J and bonding jumper tangs 64 of bonding jumper J' provide multiple electrical contact points with the respective skirts 18 and 20 of sealing flanges 14 and 16, respectively. Similarly, retaining tangs 50 of bonding jumper J and retaining tangs 60 of bonding jumper J' provide multiple electrical contacts with the coupler 30 and the nut 32, respectively, whereas coupler contact tangs 62 provide multiple electrical contact points between bonding jumper J and coupler 30. Thus, multiple redundancy is provided so that an electrical contact is assured between conduits 10 and 12 to minimize any buildup of static electricity potential between the two conduits. Advantageously, either or both of retaining tangs 60 and coupler contact tangs 62 may be bent or twisted clockwise as viewed from the open end of nut 32 so that the corners thereof tend to dig into the surface of groove 46 and minimize the tendency of nut 32 to unscrew from coupler 30. As a further safeguard, diagonal holes 70 are formed, as by drilling, from the peripheral surface through flange 43 of coupler 30. Similarly, diagonal holes 72 are drilled from the outer peripheral surface of nut 32 through flange 42. A small wire can be run through at least one pair of holes 70 and 72 with the ends of the wires twisted together so that nut 32 is restrained from turning with respect to coupler 30.

Figure 8:
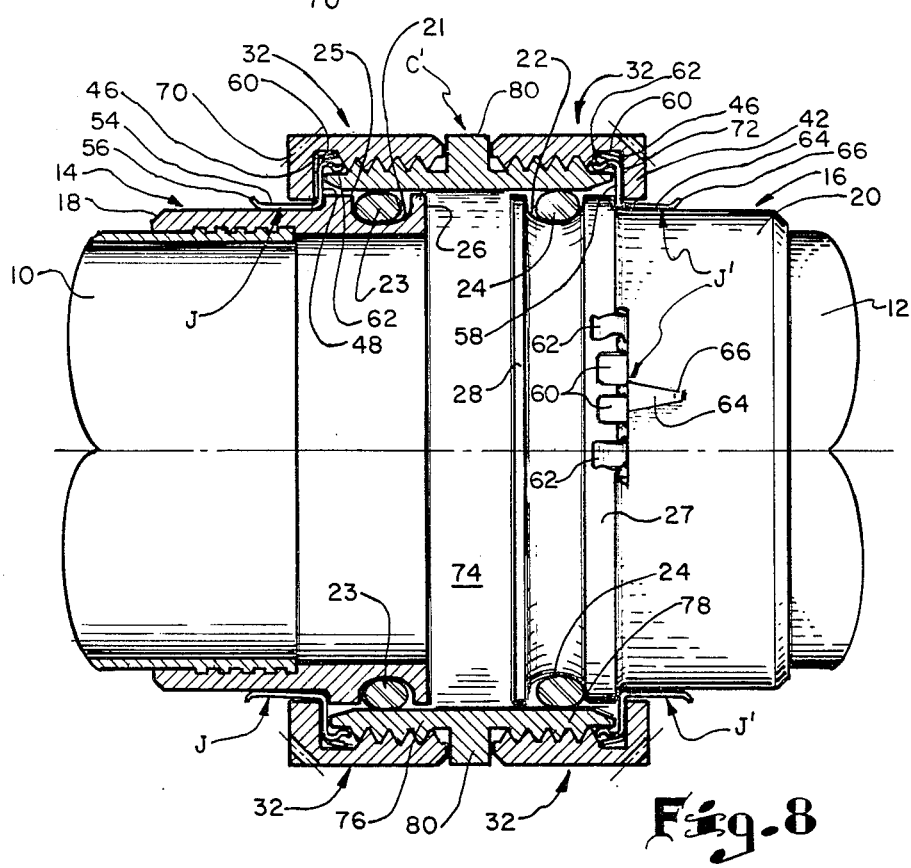
FIG. 8 is an enlarged vertical section of an alternative embodiment utilizing a spacer coupling threaded at both ends for receiving a bonding jumper carrying a nut on each end.

An alternative embodiment is shown in FIG. 8 wherein a threaded coupling C' is provided which includes a cylindrical sleeve coupler 74 which surrounds the inner ends of sealing flanges 14 and 16 and bears against o-rings 26 and 28 to provide a fluid seal. Sleeve coupler 74 has threads 76 on one end engageable by a nut 32 and another set of similar threads 78 on the other hand for receiving a second nut 32. Both nuts when tightened on the sleeve abut against a central rib 80. In this embodiment, bonding jumpers J' are used with both nuts and provide redundant electrical contact between conduits 10 and 12 via nuts 32 and spacer 80.

From the foregoing, the advantages of this invention are readily apparent. A threaded coupling is provided which utilizes a bonding jumper which is visible when it is in place so that there is no question after assembling as to whether or not installation of the bonding jumper has been made. Furthermore, it is made so as to snap into a retaining groove in a nut and coupling which are threadably interconnected to complete the joint. Additionally, each bonding jumper has a plurality of tines which engage the flanges on the conduits being coupled and also engages the nuts and coupling elements so that redundant electrical contact is provided between the two conduits. The sleeve coupler bonding jumper includes retaining tangs for snapping into the locking grooves and bonding jumper tangs which engage the flange on the conduit. With respect to the bonding jumper which is retained by the nut, in addition to the retaining tangs and bonding jumper tangs, there is also a plurality of coupler contact tangs interspersed between the retaining tangs which engage the coupler to further assure electrical contact between the flange and the coupling. Furthermore, the tangs can be twisted in a slightly clockwise direction with respect to the open end of the nuts so as to resist the possibility of the nut inadvertently unthreading with respect to the coupler.

Although the present invention has been described with reference to particular embodiments thereof, it is readily appreciated that modifications and variations can be effected within the spirit and scope of this invention.

We claim:

1. A threaded coupling assembly for interconnecting confronting ends of first and second fluid-carrying conduit members, said assembly comprising:
   first and second coupling means threadably interconnected and circumferentially engaging the confronting ends of the conduit members to hold them in fluid communication, each coupling means having an internal, circumferential retaining groove; and
   first and second bonding jumpers at least partially within each of said first and second coupling means, respectively, each bonding jumper including:
      a ring having an external peripheral edge extending into said circumferential retaining groove and an internal peripheral edge sized to just slide over the end of said conduit members;
      a plurality of retaining tangs spaced around the external periphery of said ring for releasably locking said bonding jumper in said coupling means; and
      a plurality of bonding jumper tangs spaced around the internal periphery of said ring, engagable with the end of the conduit member to provide electrical contact between the conduit members through said bonding jumpers and said threaded coupling means.

2. The assembly, as claimed in claim 1, wherein the confronting ends of said conduit members each have a sealing flange attached thereto which includes a skirt at the inner ends thereof which is sized to surround and is attached to the confronting end and an outer end having an outer peripheral recess containing an o-ring, the inner edge of the recess forming a rib with an abutting surface, and wherein:
   said first coupling means comprises a sleeve coupler, said sleeve coupler including:
      a first cylindrical body sized to slide over the flanges with the inner surface of said body in fluid-tight engagement with said o-rings;
      a first stop flange extending radially inward from one end of said first cylindrical body for engagement with the abutting surface of the rib of one of the sealing flanges, one of said internal, circumferential retaining grooves being located adjacent said first stop flange; and
      external threads on the other end of said first cylindrical body; and
   said second coupling means comprises a nut, said nut including:
      a second cylindrical body with internal threads receivable over said external threads of said sleeve coupler; and
      a second stop flange extending radially inward from one end of said second cylindrical body for engagement with the abutting surface of the rib of the other sealing flange, the other of said internal, circumferential retaining grooves being located adjacent said second stop flange.

3. The assembly, as claimed in claim 2, wherein said sleeve coupler further includes:
   an external peripheral rib intermediate the ends of said coupler serving as a stop for said nut.

4. The assembly, as claimed in claim 2, wherein with respect to said first bonding jumper:
   said retaining tangs are a plurality of relatively long circular segments extending generally axially from the outer edge of said ring and having notches formed therebetween; and
   said bonding jumper tangs are relatively narrow, one of said bonding jumper tangs being located opposite each of said notches and extending generally axially from said ring in the opposite direction to said retaining tangs; and
   with respect to said second bonding jumper:

said retaining tangs are relatively short segments and arranged in spaced pairs extending generally axially from the outer edge of said ring with a notch between each pair;

said bonding jumper tangs are relatively narrow, one of said bonding jumper tangs being located opposite each of said notches extending generally axially from said ring in the opposite direction to said retaining tangs; and a plurality of curved coupler contact tangs are spaced around the outer periphery of said ring between said spaced pairs of retaining tangs for contacting said other end of said sleeve coupler.

5. The assembly, as claimed in claim 4, wherein: said coupler contact tangs are S-shaped.

6. The assembly, as claimed in claim 4, wherein: said coupler contact tangs alternate with single retaining tangs along the outer periphery of said ring between said pairs of tangs.

7. The assembly, as claimed in claim 4, wherein: said second bonding jumper retaining tangs are twisted clockwise with respect to the other end of said nut to resist unthreading of said nut with respect to said coupler.

8. The assembly, as claimed in claim 1, wherein: said bonding jumper tang extends axially beyond the edge of said coupling means after assembly.

9. The assembly, as claimed in claim 1, wherein the confronting ends of said conduit members each have a sealing flange attached thereto, which flange includes an inner end having a skirt which is sized to surround and is attached to the confronting end and includes an outer end having an outer periphery with a recess containing an o-ring, the inner edge of the recess forming a rib with an abutting surface, and wherein:

said first coupling means comprises a spacer, said spacer comprising:

a cylindrical body sized to slide over the flanges with the inner surface of said body in fluid-tight engagement with said o-rings;

external threads on each end of said cylindrical body; and a central external peripheral rib between said threaded ends; and said second coupling means comprising a pair of opposed nuts, each said nut including:

a second cylindrical body with internal threads receivable over said external threads of said spacer; and a stop flange extending radially inward from one end of said second cylindrical body for engagement with the abutting surface of the recess of one of the sealing flanges, one of the internal, circumferential retaining grooves being located adjacent said stop flange.

10. The assembly, as claimed in claim 9, wherein with respect to each of said first and second bonding jumpers:

said retaining tangs are relatively short segments and arranged in spaced pairs extending generally axially from the outer edge of said ring with a notch between each pair;

said bonding jumper tangs are relatively narrow, one of said bonding jumper tangs being located opposite each of said notches extending generally axially from said ring in the opposite direction to said retaining tangs; and a plurality of curved coupler contact tangs are spaced around the outer periphery of said ring between said spaced pairs of retaining tangs for contacting said other end of said spacer.

11. The assembly, as claimed in claim 10, wherein: said coupler contact tangs are s-shaped.

12. The assembly, as claimed in claim 10, wherein: said coupler contact tangs alternate with single retaining tangs along the outer periphery of said ring between said pairs of tangs.

13. A bonding jumper for use within peripheral retaining grooves of a threaded coupling assembly for interconnecting confronting ends of first and second fluid-carrying conduit members, said bonding jumper comprising:

a ring having an external peripheral edge extending into said circumferential retaining groove and an internal peripheral edge sized to just slide over the end of said conduit members;

a plurality of retaining tangs spaced around the external periphery of said ring for releasably locking said bonding jumper in said coupling means; and a plurality of bonding jumper tangs spaced around the internal periphery of said ring, engageable with the end of the conduit member to provide electrical contact between the conduit members through said bonding jumpers and said threaded coupling means.

14. A bonding jumper, as claimed in claim 13, wherein:

said retaining tangs are a plurality of relatively long circular segments separated by notches extending generally axially from the outer edge of said ring; and said bonding jumper tangs are relatively narrow, one of said bonding jumper tangs being located opposite each of said notches and extending generally axially from said ring in the opposite direction to said retaining tangs.

15. A bonding jumper, as claimed in claim 13, wherein:

said retaining tangs are outwardly, radially inclined at an angle of approximately 10°; and said bonding jumper tangs are inwardly, radially inclined at an angle of approximately 10° so as to be generally parallel to said retaining tangs.

16. A bonding jumper, as claimed in claim 13, wherein:

said retaining tangs are relatively short segments and arranged in spaced pairs extending generally axially from the outer edge of said ring with a notch between each pair;

said bonding jumper tangs are relatively narrow, one of said bonding jumper tangs being located opposite each of said notches extending generally axially from said ring in the opposite direction to said retaining tangs; and a plurality of curved coupler contact tangs are spaced around the outer periphery of said ring between said spaced pairs of retaining tangs for contacting said other end of said sleeve coupler.

17. A bonding jumper, as claimed in claim 16, wherein:

said coupler contact tangs are s-shaped.

18. A bonding jumper, as claimed in claim 16, wherein:

said coupler contact tangs alternate with single retaining tangs along the outer periphery of said ring between said pairs of tangs.

* * * * *